United States Patent
Woods et al.

[19]

[11] Patent Number: 6,033,793

[45] Date of Patent: Mar. 7, 2000

[54] INTEGRATED POWER MODULE

[75] Inventors: Richard R. Woods, Irvine; Leonard Greiner, Santa Ana; David Moard, Pasadena, all of Calif.

[73] Assignee: Hydrogen Burner Technology, Inc., Long Beach, Calif.

[21] Appl. No.: 09/032,625

[22] Filed: Feb. 27, 1998

Related U.S. Application Data

[63] Continuation-in-part of application No. 08/742,383, Nov. 1, 1996, Pat. No. 5,944,510.

[51] Int. Cl.$^7$ ............................. H01M 8/06; B01D 53/22; F02P 1/00; C25B 1/02

[52] U.S. Cl. .................... 429/17; 429/20; 95/55; 123/169 EA; 205/343; 205/637

[58] Field of Search ...................................... 205/343, 637; 361/253; 123/169 E, 169 PA; 429/20, 17; 95/55

[56] References Cited

U.S. PATENT DOCUMENTS

| | | | |
|---|---|---|---|
| 3,207,953 | 9/1965 | Smith et al. ........................... 361/253 |
| 3,616,334 | 10/1971 | Aker et al. ........................ 205/637 X |
| 4,374,184 | 2/1983 | Somers et al. ........................... 429/17 |
| 4,729,931 | 3/1988 | Grimble ................................ 429/17 |
| 4,983,471 | 1/1991 | Reichner et al. ..................... 429/20 X |
| 5,047,299 | 9/1991 | Shockling ............................. 429/20 |
| 5,143,800 | 9/1992 | George et al. ......................... 429/20 |
| 5,207,185 | 5/1993 | Greiner et al. ......................... 123/3 |
| 5,299,536 | 4/1994 | Moard et al. .......................... 123/3 |
| 5,437,123 | 8/1995 | Greiner et al. ......................... 48/107 |
| 5,441,546 | 8/1995 | Moard et al. .......................... 48/107 |
| 5,498,487 | 3/1996 | Ruka et al. ........................... 429/20 |
| 5,529,484 | 6/1996 | Moard et al. .......................... 431/242 |
| 5,546,701 | 8/1996 | Greiner et al. ......................... 48/108 |
| 5,664,943 | 9/1997 | Joos et al. ............................. 431/8 |
| 5,711,882 | 1/1998 | Hofmann et al. ..................... 95/55 X |

FOREIGN PATENT DOCUMENTS

842127    5/1970    Canada ................................. 23/400

*Primary Examiner*—Stephen Kalafut
*Attorney, Agent, or Firm*—Colin P. Abrahams

[57] ABSTRACT

An integrated power module for generating thermal and electrical power is provided within a housing which includes inlets for fuel and for air, a reformer chamber, a fuel cell stack, and a combustion chamber. Oxygen-containing gas, such as air, is introduced into the module along a path in one direction in heat exchange relationship with reaction products produced in the reaction chamber traveling in an adjacent path, preferably in an opposite direction, to preheat the incoming oxygen-containing gas. A nozzle having an injector for the fuel and for the oxygen-containing gas delivers these gases to the interior of the reformer chamber, where ignition is supplied by a suitable device. The reaction products from the reformer chamber are fed to a fuel cell which will consume certain of the reaction products, such as hydrogen gas, with oxygen provided from the reaction chamber acting as an oxidizing gas. Exchange between a cathode and an anode will effect the generation of current, as well as the production of water, which normally will be absorbed as steam and passed from the fuel cell. The current generated by the fuel cell can be delivered externally to a user, while hydrogen may be combusted downstream in the combustion chamber to provide an added thermal energy source for heating. In alternate embodiments of the power module, the fuel cell is used as a shift reactor and hydrogen purification device. The primary product of this module is purified hydrogen gas, in additional to heat.

33 Claims, 3 Drawing Sheets

//6,033,793//

INTEGRATED POWER MODULE

This application is a continuation-in-part of application Ser. No. 08/742,383 filed Nov. 1, 1996 now U.S. Pat. No. 5,944,510.

FIELD OF THE INVENTION

The present invention relates generally to a power module which produces electrical current as well as heat, and which can be used for various purposes, including driving a turbine or heating a dwelling or workplace. More specifically, the present invention is an integrated module that utilizes a partial oxidizing reactor (reformer) for producing hydrogen, which is subsequently used to generate electrical current by way of a fuel cell stack. Excess hydrogen and gas product may then be used to produce additional heat in a combustion chamber downstream of the fuel cell. Alternatively, the fuel cell can be substituted with an electrochemical reactor or diffusion membrane which is designed to further process the partial oxidation product gas for downstream equipment or to purify the product gas.

BACKGROUND OF THE INVENTION

In the generation and delivery of energy sources, including heat and electricity, to both small users in residential markets and large users in industrial markets, the control of pollution products, improved energy efficiency, and cost-effectiveness are increasingly acute concerns.

Prior attempts to address these concerns have typically involved large-scale, capital-intensive equipment and processes. For example, the prior art has endeavored to control pollution by using complicated equipment or cleaner-burning fuels at large energy facilities. Similarly, efficiency gains, which decrease primary energy consumption, have been realized through the staging of processes and the combining of energy cycles (e.g., large combined-cycle power plants).

In larger industrial and commercial facilities, cogeneration systems have been used to provide the combined benefits of generating electrical energy on-site and being able to recover and use by-product heat energy. However, such prior art technologies have generally not been cost-effective in small-scale systems. For example, fuel cell technologies offer exceptional efficiency and environmental benefits, but the high cost of fuel cell stacks in low-volume production and the complexity of systems packaged with individual, discrete components have continued to prevent this technology from becoming cost-competitive. Larger scale systems have been developed in an attempt to decrease the impact of system complexities, but increased capital risk per unit of these plants has prevented sufficient demonstrations to verify benefits and improve durability and therefore has prevented high-volume production of such systems. In addition, relatively simple, small-scale fuel cell units which use pure hydrogen as a fuel source show some benefits, but the high cost of pure hydrogen and the lack of an extensive hydrogen distribution infrastructure have limited this approach.

Representative of the prior art is U.S. Pat. No. 3,516,807, in which a reaction chamber is provided with a mixing tube fed with air that has been heated in the exit of a combustion chamber. One of the purported objectives of this structure is to provide free hydrogen for use in a fuel cell. The structure relies, however, on a ducting or path arrangement which is likely to cause carbon or other kinds of deposits which will tend to rapidly accumulate and, consequently, retard or even stop the combustion process. This and other prior art devices have also typically failed to efficiently utilize the by-product heat from hydrogen production or to produce a sufficient quantity of electrical current as to be commercially usable.

Furthermore, attempts to address these problems, as well as others inherent in the use of non-polluting fuels, have often resulted in much greater expense in terms of the converting apparatus and the by-product handling equipment. The use of non-polluting or low-pollution-generating fuels has similarly resulted in much greater equipment expense, as well as more cumbersome controls than could be efficiently marketed to both industrial and residential users.

With the world's increasing population and improving standard of living, the need for electricity and heat is expected to grow substantially. Provision of such increased energy demands using the prior art's large central facilities and massive distribution infrastructures would be exceedingly capital-intensive. The availability of a small-scale, cost-effective, and non-polluting integrated power module capable of providing both electricity and heat using existing fuel sources can eliminate the need for massive capital investments in infrastructure and electric distribution facilities while incrementally providing the energy needs of developing populations.

SUMMARY OF THE INVENTION

The present invention obviates the foregoing problems and difficulties, and provides a combined source of heat and electrical power that is substantially pollution-free. In one form of the invention, a single, integrated module is provided, the module having simplified internal heat transfer and component integration to achieve a cost-effective system. Further, utilization of incoming fuel is staged to concurrently minimize emissions and maximize efficiency.

In accordance with one embodiment of this invention, such objectives are achieved in a small, modular power generator that can serve as an energy source for residential appliances, commercial equipment, and industrial processes. In a preferred embodiment, the stages of the unit are integrated thermally so that the inlet process gases provide cooling to various downstream components while also providing regenerative preheating for higher temperature upstream components.

In a preferred embodiment of the present invention, the staged consumption of fuel first involves a partial oxidation reformer process which operates at a fuel-rich level (i.e., air/fuel stoichiometric ratio less than about 0.8) to create a hydrogen-containing gas stream that is subsequently processed by downstream stages. The air/fuel stoichiometric ratio in the reformer process is preferably between about 0.1 and 0.7, and is most preferably between about 0.2 and 0.4. The second stage is a stoichiometrically-balanced region, where fuel is reacted with oxygen electrochemically for high-efficiency conversion to electricity, without unwanted side reactions that create pollution in conventional combustion equipment. Finally, the third stage consumes any remaining fuel in a fuel-lean (i.e., air/fuel stoichiometric ratio greater than about 1.1) combustor. The air/fuel stoichiometric ratio in the third stage combustor is preferably above about 1.4. This third stage not only ensures the elimination of all non-reacted fuel, but also generates additional thermal energy which can be useful in a number of applications. The final stage does not create unwanted pollution (e.g., thermal $NO_x$) because the hydrogen present in the fuel stream allows stable operation at these high stoichiometric ratios. In an alternate preferred embodiment, the second stage comprises a fuel cell for the generation of electrical current. In this alternate embodiment, a compression spring or a set of compression springs may be used to exert a mechanical force on the fuel cell.

A particular advantage of the present invention is the integrated design and structure of the power module that effects both preheating of the process gas and cooling of the product gas, as well as the components of the unit within the three stages, while minimizing interface complexities and equipment. According to one aspect of the present invention, cool inlet process gases enter the module and provide cooling to the fuel cell module and associated fuel cell compression hardware, while simultaneously providing preheating of the process gases for both the fuel cell and the reformer reaction, thereby increasing efficiency. As the inlet process gases progress toward the partial oxidation reformer, additional preheating is achieved in parallel with reformer product gas cooling. One embodiment would increase the air flow to achieve sufficient cooling of reformer product gases prior to introduction into the fuel cell. This excess air could then bypass the reformer and the fuel cell and enter into the fuel-lean combustion process. This would eliminate the need for water quenching. Evaporative water-to-steam quenching ultimately controls the fuel cell's anode process gas temperature.

Another advantage is the design of the partial oxidation reformer. Appropriate preheating and mixing of both the oxygen-containing gas (e.g., air) and the fuel gas are necessary to achieve stable operation and the generation of an appropriate amount of hydrogen gas for the downstream fuel cell and low emissions combustor. To this end, specifically-designed nozzles have been developed which, in combination with the appropriate preheating of the oxygen-containing gas after startup, will effect thorough and homogeneous mixing of the oxygen-containing gas and the fuel gas or vapor upon injection into the reaction chamber. Further, the design of the reaction chamber is such that the injected and mixed gases will be further mixed by impingement upon a wall (preferably, the rear or facing wall) of the reformer chamber, in a manner such as that disclosed in prior U.S. Pat. No. 5,299,536, the disclosure of which is incorporated herein by reference.

BRIEF DESCRIPTION OF THE DRAWINGS

Other advantages of the invention will become apparent as consideration is given to the following drawings in which.

DETAILED DESCRIPTION OF THE INVENTION

Figures 1A, 2A, 2B, 2C:
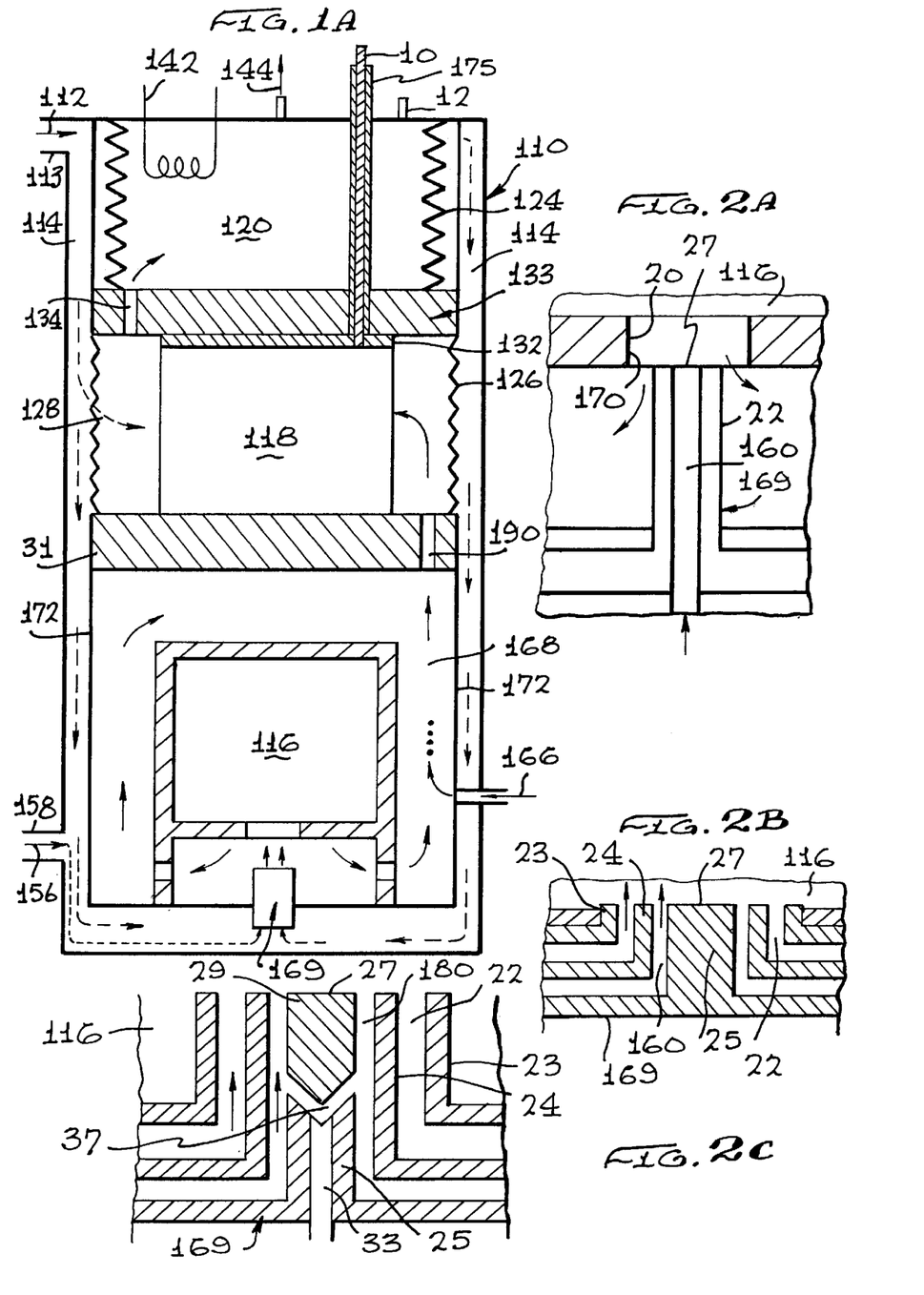
FIG. 1A is a cross-sectional block diagram illustrating the major components of an embodiment of the present invention and the process flow through the various components.
FIGS. 2A, 2B, 2C, and 2D are cross-sectional views of injector nozzle designs useful in the present invention.

Referring now to the drawings, wherein like numerals designate corresponding parts, there is shown in FIG. 1A a cross-sectional block diagram illustrating the arrangement of major components of the integrated power module of the present invention, together with the flow path of the process air, the process fuel, and the product gas stream through the major components. As illustrated in FIG. 1A, the integrated power module comprises a housing 110, in which a reformer 116, a fuel cell 118 and a combustor 120 are integrated into a single insulated assembly. The specific details of these components, as well as other features of the invention, will be described in conjunction with FIGS. 1B through 4B.

Referring in detail to FIG. 1A, inlet air 112 enters through inlet tube 113 at one end of the housing 110, which housing may be of any desired shape, but is preferably cylindrical in shape for improved efficiency, lower cost, and simpler fabrication. The inlet air 112 moves along an outer, annular volume 114 which is in heat exchange relationship with a barrier in the form of one or more compression springs 124. The compression spring or springs 124 surround the combustor 120 and are cooled by the inlet air 112. The spring force of the compression spring(s) 124 is partially preserved by the cooling. The compression spring(s) 124 act between an end (preferably, the upper end) of the housing 110 and a compression plate set 133 and exert a mechanical force on the fuel cell 118. Preferably, the compression plate set 133 comprises individual plates 130, 131, and 132, which are described in more detail in connection with FIG. 1B.

The inlet air 112 traveling along the annular volume 114 also effects cooling of the fuel cell 118 through flexible barrier wall 126. Preferably, as illustrated in FIG. 1A, the fuel cell 118 is positioned below the combustor 120. A portion of the inlet air 112 is diverted through orifice 128 to provide oxygen to the cathode manifold of the fuel cell 118. The orifice 128 can be positioned at any suitable position between the top and bottom of annular volume 114 and may be of any appropriate shape so as to permit introduction and distribution of inlet air 112 into the fuel cell 118 at the appropriate flow rate and inlet temperature.

The remaining inlet air 112 which flows through the annular volume 114 and below fuel cell 118 will continuously absorb heat from (i.e., be preheated by) the product gas of reformer 116 through heat exchange wall 172. Preferably, the inlet air 112 is preheated to at least 1000° F., and, most preferably, is heated to between 1000° F. and 1800° F. (or higher) to enhance efficiency.

At least a portion of (i.e., all or a portion thereof) the inlet fuel 156 is supplied to the fuel injector 160 through a conduit 158 located at any suitable position on the housing 110. The inlet fuel may comprise any combustible fuel or fuel/steam mixture. The conduit 158 is inserted in annular volume 114 so that the inlet fuel 156 is preheated through contact with either heat exchange wall 172 (which is in thermal contact with reformer product gas) or the now-preheated inlet air 112, or both. The inlet fuel 156 is preferably preheated to between 500° F. and 1000° F. Other embodiments of conduit 158 are feasible, including a separate shell surrounding annular volume 114 or other means of preheating the inlet fuel 156 through contact with heat exchange wall 172 or preheated air in annular volume 114.

The preheated inlet air 112 and inlet fuel 156 are introduced to the reformer 116 through a nozzle 169, which comprises a fuel injector 160 and an air injector 22, which are described in greater detail below. The inlet air 112 and the inlet fuel 156 become mixed upon injection into the reformer 116. Various nozzle designs capable of providing air/fuel intermixing will be apparent to those skilled in the art. Examples of suitable nozzle configurations are discussed in greater detail in conjunction with FIGS. 2A, 2B, 2C, and 2D. In addition, the fuel and the gas can be mixed prior to introduction into the reformer, such that the fuel injector and the air injector may be the same (e.g., the nozzle may comprise a single injector for both fuel and gas).

Referring again to FIG. 1A, once the preheated inlet air 112 and inlet fuel 156 are injected through the nozzle 169 into the reformer 116, partial oxidation combustion at a fuel-rich level (i.e., air/fuel stoichiometric ratio less than about 0.8) can occur. The air/fuel stoichiometric ratio is preferably between about 0.1 and 0.7 and most preferably is between about 0.2 and 0.4.

The air/fuel mixture is ignited (e.g., by way of a spark plug) and, typically, reforming temperatures in the 2300–3000° F. range are achieved. Reformer product gases then pass out of the reformer 116 and into passage 168 and thereby heat the heat exchange wall 172, which is in heat exchange relationship with annular volume 114. The velocity of the gas in passage 168 is preferably maintained high to enhance heat transfer. Water and/or steam may be introduced through input 166 and injected into the reformer product gas in passage 168; input 166 may be placed at any suitable position. Input 166 may be in thermal contact with heat exchange wall 172 to facilitate evaporation of water in input 166 prior to injection into passage 168. The water vapor thereby quenches the temperature of the reformer product gas stream. Preferably, the temperature of the reformer product gas is lowered to approximately 1300° F. based on fuel cell requirements and product gas stability.

The partially-cooled reformer product gas stream flows from passage 168 into the anode manifold of the fuel cell through channel 190 located in current collector wall 31, which is positioned between the fuel cell 118 and the reformer 116. Inlet air 112, diverted at orifice 128 to the fuel cell 118, enters the cathode manifold of the fuel cell. Preferably, the fuel cell is operated under stoichiometrically-balanced conditions, so that fuel is reacted with oxygen electrochemically to yield electricity with high efficiency, without unwanted side reactions that create pollution. The fuel cell 118 generates direct current which may be drawn off for external use through terminals 10 and 12, which may be placed at any of various positions on the module as appropriate. The voltage and current output is dependent on the fuel cell area, number of cells, and performance.

The anode exhaust gas exiting the fuel cell 118 passes through exit passage 134 into combustor 120 after undergoing some temperature quenching by virtue of contact with the flexible heat transfer barrier wall 126, which is in thermal contact with the relatively cooler inlet air 112. The temperature of the anode exhaust gas is approximately 1500° F., but is dependent on the fuel cell type and performance, and the extent of heat transfer through flexible barrier wall 126 and water injected at input 166. The cathode exhaust gas from the fuel cell 118 is directed to the combustor 120 through conduit 129 (shown in FIG. 4B).

The combustor 120, described in greater detail below, is preferably operated at a fuel-lean level (i.e., air/fuel stoichiometric ratio above about 1.1; most preferably, above about 1.4). The combustor preferably includes a heat recovery device, such as a heat transfer coil 142, to deliver the heat energy recovered from the process and/or generated by combustion to a downstream user or appliance. The exhaust gas 144 from the module passes out of the system through exhaust duct 141 (shown in FIG. 1B).

Figure 1B:
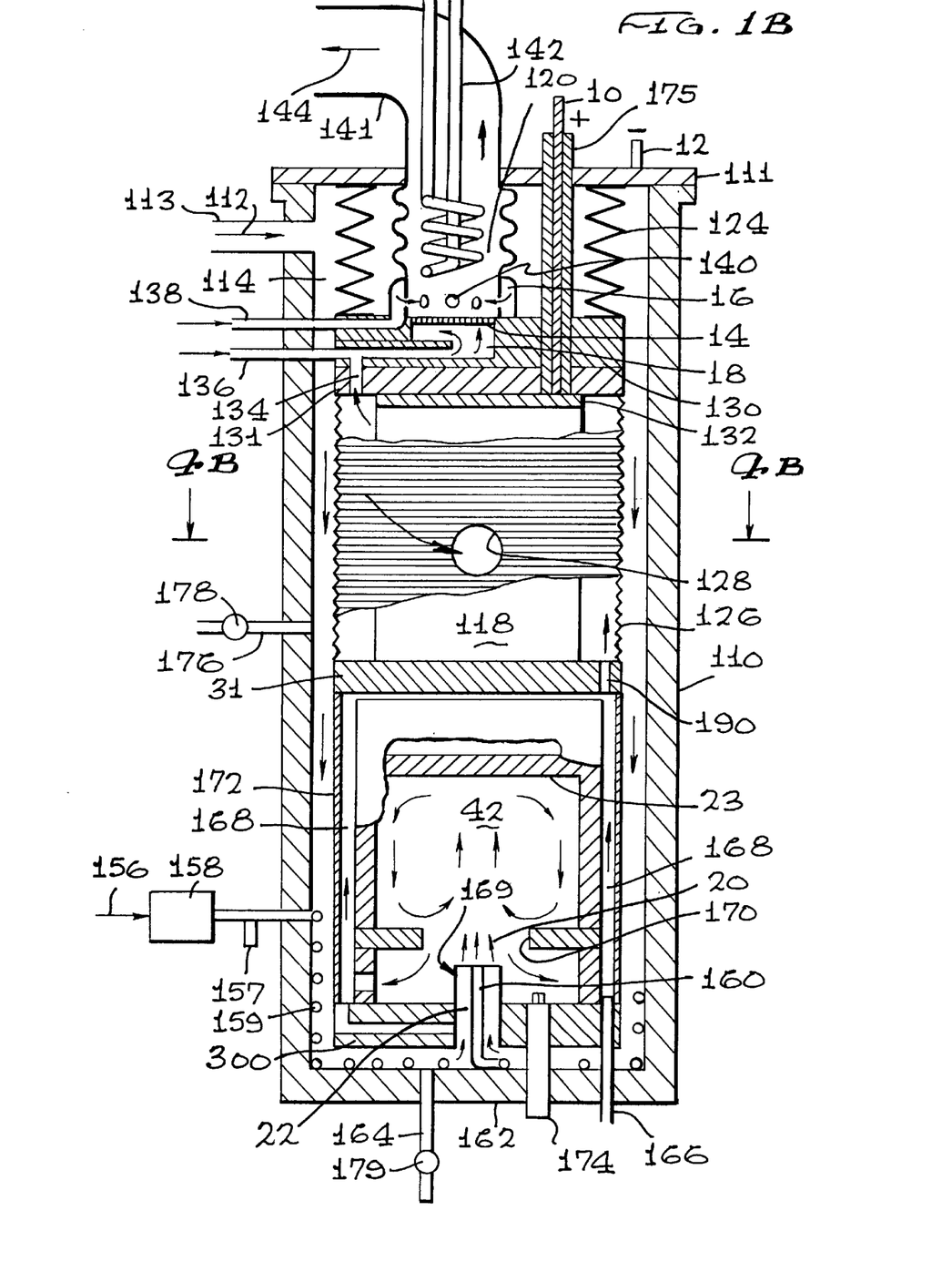
FIG. 1B is a cross-sectional detailed view of a preferred embodiment of the present invention.

Referring now to a preferred embodiment of the present invention, as illustrated in FIG. 1B, the housing 110 is thermally insulated to minimize heat loss and to provide external thermal protection for users. Any of a variety of insulating materials can be used, including but not limited to fiberboards, foams, and/or blanks which are selected for their insulation properties and temperature compatibility. The housing 110 also includes a cover flange 111 which optionally can be removed for direct access to the combustor 120 and compression spring(s) 124. Withdrawal of the combustor 120 and compression spring(s) 124 through the cover flange 111 permits access to and withdrawal of the fuel cell 118 and reformer 116. Accessibility to the individual components of the integrated power module is useful for maintenance, inspection, and repair of the components, if necessary. In one embodiment, compression springs 124 are composed of materials which when heated expand in such a way as to increase the compressive force.

In this embodiment, compression spring(s) 124 provide mechanical force between the underside of the cover flange 111 and compression plate 130, the topmost plate of the compression plate set 133 (shown in FIG. 1A), which plate set comprises plates 130, 131, and 132. The flexible barrier wall 126, which can resemble a bellows, surrounds the fuel cell 118 and extends downward from the underside or the periphery of the compression plate set 133 to sealingly engage the current collector wall 31, located above the reformer 116. Preferably, a ring seal or weld is used to provide a gas-tight interface seal between the lower end of the flexible barrier wall 126 and the outer periphery of compression plate 130. Similarly, a ring seal or weld provides a gas-tight seal between current collector wall 31 and (i) flexible barrier wall 126, and (ii) heat exchange wall 172. The compression spring(s) 124 and the flexible barrier wall 126 permit thermal expansion and contraction of the fuel cell 118 during operation of the module.

An electrical insulation plate 131 is positioned between compression plate 130 and current collector plate 132. In FIG. 1B, current collector plate 132 is positive (cathode side), but the stack polarity can be reversed, if desired. Positive terminal 10, which is in electrical contact with current collector plate 132, provides a user connection to the electrical current produced by the fuel cell.

As illustrated in FIG. 1B, the combustor 120 is provided with an exhaust duct 141 attached to the cover flange 111 to direct exhaust gas 144 out of the module. The exhaust duct 141 can be moved with the cover flange 111 when the cover flange 111 is removed from the housing 110. The bottom of exhaust duct 141 engages or interfaces with a perforated surface element 14, which serves as the base for and defines the physical dimensions of the combustor 120. Surface element 14 can be catalyzed to enhance spontaneous ignition or the combustion chamber 120 can be equipped with a spark ignition source (not shown). A removable heat transfer coil 142 located in the exhaust duct 141 is provided to recover heat for downstream or external use.

The reformer 116 in FIG. 1B is located proximate to the bottom of the integrated power module and is insulated thermally from a bottom seal plate 300, which is supported against the base 162 at the bottom of the module assembly. A spark plug 174 extends into the reformer 116 through bottom seal plate 300 and the base 162 to provide ignition during start-up of the reforming combustion.

The housing 110 may optionally be provided with valved tubes 164 and 176, which will serve to allow bleeding off of air from annular volume 114 or addition of additional air to annular volume 114. These bleed tubes will allow adjustment of the air flow which may be required to control the amount of oxygen delivered to the reformer 116, temperature of the preheated air 112, and/or the level of cooling provided to the reformer product gas and the fuel cell 118. These will be utilized to control the temperature and mass flow of the incoming air to provide the proper mixture at air injector 22. Appropriate sensors may be employed within the annular volume 114 to control air valves 178 and 179 provided in the valved tubes 176 and 164, respectively. Additionally, the housing 110 may be provided with an ancillary input 166 to supply steam or methane or a mixture of these to the passage 168. Thus, the constituents of the gas products can be optimized prior to introduction to the fuel cell 118.

In the embodiment illustrated in FIG. 1B, inlet process air 112 is introduced through inlet tube 113 into annular volume 114, which is created by the space between the inside wall of the housing 110 and (i) the compression spring(s) 124, (ii) the flexible barrier wall 126, and (iii) the heat exchange wall 172. The relatively cool inlet air 112 serves to cool the compression spring(s) 124. A portion of the inlet air 112 is diverted through orifice 128 to provide oxygen to the fuel cell 118. The diverted inlet air 112 ultimately flows through the fuel cell 118, in which oxygen from the inlet air 112 is consumed. Typically, the temperature of the preheated air entering orifice 128 will be approximately 1000–1300° F., but the temperature will be fuel cell type dependent. The placement of orifice 128 can be at any appropriate position to achieve the desired temperature. An extension tube down along heat exchange wall 172 can be used to effect increased temperatures. The diverted, now oxygen-depleted air stream exits the fuel cell 118 and enters cathode outlet manifold 238 (shown in FIG. 4B), eventually passing through conduit 129 (shown in FIG. 4B) and through insulation plate 131 and compression plate 130. The depleted air finally enters pre-combustion zone 16 and passes through port(s) 140 into the combustor 120.

Below the fuel cell location, non-diverted inlet air 112 will pass in heat exchange relationship with heat exchange wall 172 to take up heat from and thereby cool the product gases in annular volume 168. Inlet air 112 is preheated as a result of movement along the annular volume 114 and enters the reformer 116 through air injector 22 at a temperature of approximately 1000–1600° F., or even higher.

Concurrent with the air flow described above, inlet fuel 156 enters the module through conduit 158 and is preheated by heat exchange surfaces 159, which are in thermal contact with heat exchange wall 172. Preheated inlet fuel 156 is injected into reformer 116 through fuel injector 160. Simultaneously, as described above, preheated inlet air 112 is injected into reformer 116 through air injector 22. The inlet air and fuel begin to mix upon injection into reformer 116, and are further mixed by impingement upon the rear wall 23 (top wall of reformer 116 in FIG. 1B), which faces the injectors and whose plane is transverse to the direction of the injected air and fuel. Such an approach is described in detail in U.S. Pat. Nos. 5,207,185, 5,529,484 and 5,441,546, the disclosures of which are incorporated herein by reference. This design results in enhanced mixing of the fuel and air, which in turn results in enhanced combustion efficiency. FIG. 1B illustrates the process flow path 42 of the air/fuel mixture within the reformer 116. Flow ring 170 promotes increased recirculation of the fuel/air mixture within the reformer 116 to enhance combustion and mixing.

Once combustion is initiated inside the reformer 116, such as by spark plug 174, burning will take place and the gas expansion and heat will cause expulsion of reformer product gases back through reformer port 20. In the reformer 116, partial oxidation reforming of the fuel occurs at a temperature typically within the range of 2300–3000° F.

Following partial oxidation combustion within the reformer 116, reformer product gases exit through passage 168 which extends the length of the reformer 116 and enters the anode manifold of the fuel cell 118 through conduit 190. Optionally, the reformer product gases may be temperature-quenched with water, steam, methane, or other fluid or gas from input 166 prior to introduction into the fuel cell 118. Alternatively, catalyst can be disposed in passage 168 and a steam/fuel mixture can be introduced through input 166, thereby promoting an endothermic steam reforming-type reaction that achieves the desired quenching effect. In the fuel cell 118, reformer product gas carbon monoxide (CO) is converted into carbon dioxide ($CO_2$) and hydrogen ($H_2$) via a shift reaction. Water produced by the fuel cell 118 is vaporized and exits with the depleted fuel stream through exit passage 134 located in insulation plate 131 and compression plate 130. The depleted fuel then enters the fuel distribution zone 18 and enters the combustor 120 through perforated surface element 14.

As shown in FIG. 1B, the fuel cell 118 is equipped with terminals 10 and 12. to supply current to an external device. Electrical energy from the fuel cell 118 is collected in current collector wall 31 and flows through conductive flexible barrier wall 126 into compression plate 130, where it subsequently passes into compression spring(s) 124 and into ground terminal 12 located on cover flange 111. Ground terminal 12 can be located at any other appropriate location on the housing 110 which is in electrical contact with current collector wall 31. The electrical energy then flows to a customer's load. Electrons from the customer load enter the positive terminal 10 and flow to the current collector plate 132, where they are transferred back into the fuel cell 118. Insulation layer 175 provides isolation of the positive terminal 10 from the grounded cover flange 111 and compression plate 130. Insulation plate 131 provides electrical isolation between current collector plate 132, compression plate 130, and flexible barrier wall 126.

The anode exhaust gas from the fuel cell 118 will be passed to combustor 120 through exit passage 134 at a temperature of typically 1500° F. to 1800° F., but this again will depend on the fuel cell type, performance, and the extent of heat transfer through flexible barrier wall 126. The cathode exhaust gas will exit the fuel cell 118 and be passed also to combustor 120, but through a conduit 129 (shown in FIG. 4B), again at approximately the same temperature.

Within the combustor 120, depleted air from port(s) 140 and depleted fuel from perforated surface element 14 react and combust to liberate heat, which can be recovered by a downstream user or appliance through a heat transfer coil 142. For example, the thermal energy recovered in this manner can be used to heat water that is then circulated through a residence or workplace to provide either hot water or heat, as needed. Finally, exhaust gas 144 exits the integrated power module through exhaust duct 141.

In an alternate embodiment of the present invention, where the module is a liquid-fueled system, steam or a small amount of air may be introduced via tube 157 so that it becomes premixed with the inlet fuel 156, thereby enhancing the reforming process and preventing particulate formation within the reformer 116.

In another alternate embodiment, additional heat can be generated by enhancing combustion within the combustor 120 by adding air through conduit 138 to mix with the depleted air from conduit 129, and/or adding fuel through conduit 136 to mix with the depleted air from exit passage 134.

In yet other embodiments, increased control over characteristics such as the preheating temperature, process cooling, humidity and process stoichiometric composition/ratios can be achieved through various features or modifications. Examples of such features or modifications include: (i) passing additional air through inlet port 113 and/or withdrawing a portion of the inlet air 112 through air valve 178 and/or air valve 179 to enhance the cooling effect on the fuel cell 118 (this procedure also results in better control of the preheating temperatures for air entering the fuel cell through orifice 128); (ii) passing additional air into the module through air valve 178 to enhance the cooling effect of reformer product gases exiting in passage 168 or to better control the preheating temperature of the air entering the reformer 116; (iii) adding or removing air via air valve 179 to better control the preheating temperature of reformer air and the reformer stoichiometric ratios; and (iv) withdrawing air from air valves 178 and 179 and reinjecting the air into the module through conduit 138 to enhance heat recovery and overall efficiency. In sum, the performance of the integrated power module may be optimized by controlling one or more parameters by directing through the one or more valves, conduits, or inlets at least one process enhancer such as but not limited to an oxygen-containing gas, a combustible fuel, water (or steam), carbon dioxide, or air. The parameters which can be controlled include the inlet gas, the inlet fuel, the injected fuel, the injected gas, the reformer product gas, the fuel cell inlet gas, the anode exhaust gas, the cathode exhaust gas, the combustor inlet gas, and the combustor exhaust gas. Other features and modifications to improve the efficiency and performance of the integrated power module of the present invention will be apparent to those skilled in the art.

With reference now to FIG. 2A, there is shown an enlarged cross-sectional view of a coaxial nozzle 169 useful in the present invention. Specifically, the reformer port 20 at the entrance to the reformer 116 is defined by flow ring 170, which may preferably have a thickness of from one-half to three inches in the direction of flow from the end of the injectors 160 and 22. In this nozzle design, the fuel injector 160 comprises the inner volume of the coaxial nozzle, and the air injector 22 comprises the outer annular volume of the coaxial nozzle. The inlet fuel may comprise any suitable liquid or gaseous fuel, including but not limited to natural gas, ethanol, methanol, gasoline, kerosene, methane, and mixtures thereof with steam. The two injectors 22 and 160 are preferably coterminous at nozzle end 27. With such an arrangement, the flow from nozzle end 27 will collapse on itself and enhance inlet air/fuel mixing prior to combustion. In addition, the nozzle end 27 of the fuel injector 160 and the air injector 22 is preferably located in a plane that is coplanar or lower relative to the reformer port 20 as shown in FIG. 2A. The positioning of the nozzle end 27 may be adjusted to achieve different reaction characteristics, if desired. The flow of reformer product gases is indicated by arrows. The reformer port 20 defined by flow ring 170 is of sufficient size to permit unimpeded injection of the fuel and air.

With reference to FIG. 2B, it will be seen that the nozzle is constructed from concentric tubes 23 and 24, together with a central rod 25. Preferably, air is fed through air injector 22, while fuel is fed through fuel injector 160; however, alternate combinations are feasible. The presence of the central rod 25 will enhance the gas mixing at the nozzle end 27.

In the embodiment of FIG. 2C, the central rod 25 is replaced by a plug 25, provided with a fuel passage 33 centrally therein. A deflector 29 is located in line with the axis of the fuel passage 33 and defines diverging fuel outlets 37. The deflector 29 can be supported by struts (not shown) extending across the fuel outlets 37. With this arrangement, a steam/fuel mixture is preferably supplied through injector 161 and air through air injector 22, although these supplies can be interchanged. This configuration, with deflector 29 and with the appropriate dimensioning of the diameters of the tubes 23 and 24, and with the appropriate pressure for the steam, creates a suction on the inlet fuel passage as the steam flows past fuel outlets 37, thereby enhancing mixing and promoting vaporization at the exit end of the nozzle. Deflector 29 can also be constructed from a capped tube with holes providing fuel outlet 37. Holes can also be added in tube 24 to allow air and fuel premixing prior to injection into reformer 116.

Figure 2D:
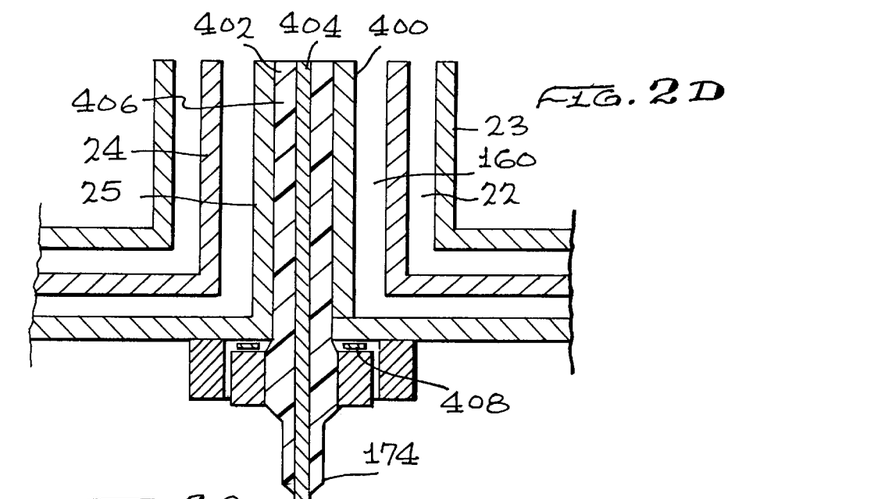

In the embodiment of FIG. 2D, the central rod 25 is made of a tube 400 surrounding a spark igniter 402, which replaces spark plug 174 of FIG. 1B. Spark igniter 402 is made from a conductive rod 404 and a non-conductive insulation sleeve 406. Seal ring 408 is used as a pressure seal.

Figure 3A:
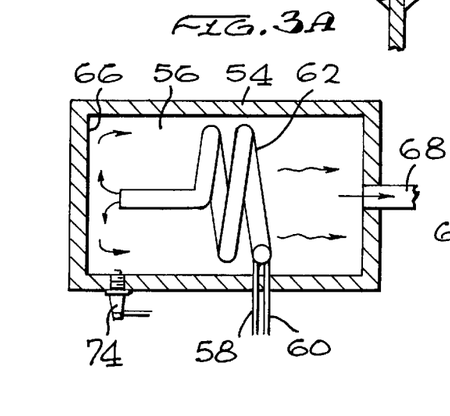
FIGS. 3A and 3B are cross-sectional views of alternate embodiments of the reformer chamber of the present invention.
Figure 3B:
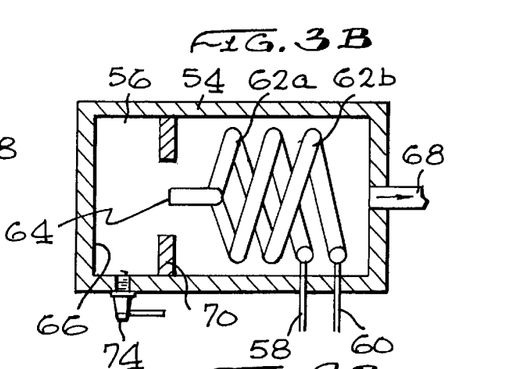

With reference now to FIG. 3A, there is shown an alternate embodiment of a reactor chamber 54, the interior 56 of which serves as a combustion zone and which is provided with a helical tube 62 which receives a fuel gas through an inlet 58 and an oxygen-containing gas through an inlet 60. The fuel and oxygen-containing gases are heated during their passage through the helical tube 62 to provide an intimate mixture, which is then injected into the chamber 56 through outlet 64. The gases are further mixed by directly impinging on the rear wall 66 as shown. A sparking device 74 is provided to initiate ignition. The reaction products will then in turn heat the contents of the helical tube 62 before exiting through the outlet 68. The foregoing structures are described in more detail in prior U.S. Pat. No. 5,299,536, the disclosure of which is incorporated herein by reference. It will be appreciated by those skilled in the art that the reaction chamber of FIG. 3A can be readily incorporated in place of reformer 116 of the FIG. 1B embodiment. The FIG. 3A embodiment is better for low-volume production. In FIG. 3B, a modification of the arrangement of FIG. 3A is shown where the fuel and air flows are maintained separate as heating of both flows takes place in separate helical tubes 62a and 62b. In addition, a flow ring 70 is positioned approximately coplanar with outlet 64 to enhance recirculation of the air/fuel mixture within the reformer. In these embodiments, the functional heat exchange walls 172 and 159 in FIG. 1B are replaced by the walls of components 58, 60, 62, 62a, and 62b. The function of conduit 190 in FIG. 1B is replaced by outlet 68.

In general, the structures of the present invention are not limited in their applications by the scale of the parts although there may be a practical commercial upper limit for the fuel cells.

Figure 4A:
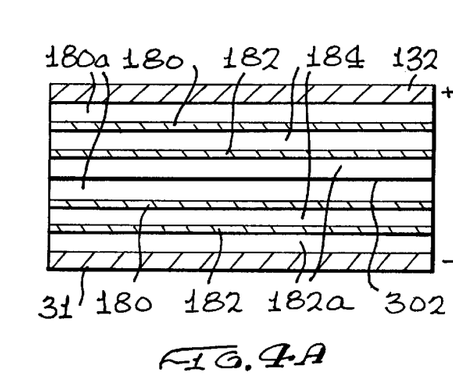
FIG. 4A is a cross-sectional view of one embodiment of the fuel cell stack and FIG. 4B is an elevational view of the fuel cell along line IVB—IVB of FIG. 1B.
Figure 4B:
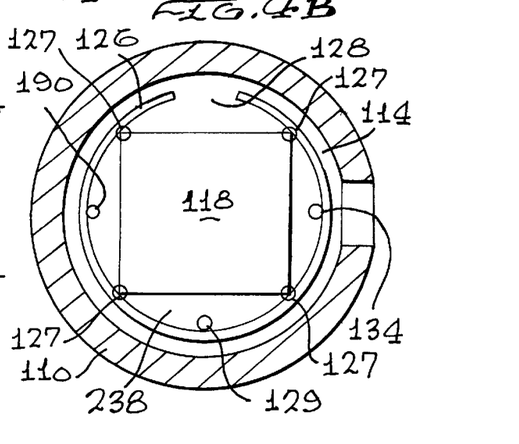

Referring now to FIGS. 4A and 4B, there are shown schematically two views of a fuel cell stack that can be usefully employed with the present invention. It will be understood, of course, that other electrochemical converters can also be employed so long as these devices are capable of making use of the hydrogen generated by reformer 116.

Further, while stacked rectangular plates are illustrated in FIGS. 4A and 4B, with external manifold areas defined by the intersection of the stacked corners with the inside surface of the flexible barrier wall 126, it will be readily appreciated by those skilled in this technology that circular planar cells with internal manifolds or tubular arrays of cells could be fully employed with modifications to the placement of interface passages 190, 134, 128 and 129. In the illustrated form, corner seals 127 are required to separate the gas flows through the cell.

In FIG. 4A, a cathode plate series 180 and cathode gas passage 180*a* is interleaved with anode plate series 182 and anode gas passage 182*a*, with the anode plates and cathode plates separated by suitable electrolytic layers 184 and a separator plate 302. Due to the elevated temperature of the reaction gases, and the high hydrogen content on the anode plates and high oxygen content on the cathode plates, the following reactions will take place with a solid oxide fuel cell:

$$\text{Anode } H_2 + O^= \rightarrow H_2O + 2e^-$$

$$\text{Cathode } \frac{1}{2}O_2 + 2e^- \rightarrow O^=$$

$$\text{Overall} \rightarrow H_2 + \frac{1}{2}O_2 \rightarrow H_2O + electricity + heat$$

In the fuel cell 118, the electrolyte which is ion uses an electrolyte which is preferably a solid oxide or a molten carbonate, but other electrolyte layers are feasible that are electrically conducting and/or conduct positive or negative ions (i.e., are ionically conducting). Typically, such fuel cells operate at a temperature of 1000° to 1800° F. (600–1000° C.). At these operating temperatures, water that is generated will be quickly evaporated and moved with the gas flowing out of the fuel cell. Any suitable porous metal oxides, conductive ceramics, or metal can, of course, be employed as the electrodes.

Preferably, with the combustor 120 operating at a fuel-rich stoichiometric ratio of greater than 1.4, the fuel cell exhaust anode and cathode gases can be fed to the combustor 120 and combusted. When maintained at a ratio greater than 1.4, combustion will occur with low emissions, in particular, low thermal $NO_x$.

Steam may be provided in the reformer product gas flow to the anodes of the fuel cell stack to facilitate the reactions producing carbon dioxide, hydrogen and heat. This will eliminate carbon monoxide in the fuel cell anode passages and thereby minimize objectionable pollutants.

Referring again to FIG. 1B, the anode off-gases will pass through exit passage 134 and can be mixed with additional methane or natural gas fuel through conduit 136 before being fed to the combustor 120. This is useful particularly at start-up to be supplied through heat transfer coil 142 or when additional heat is needed by the user. Additional air can be supplied through conduit 138 and port(s) 140 to assist in complete combustion. The cathode off-gases are fed through a cathode outlet manifold 238 (as shown in FIG. 4B), located in compression plate 130, into prechamber 16 and then to combustor 120.

The current collector plate 132 will be connected on one face thereof to a terminal 10 which is insulated by a ceramic collar 175, which extends through the cover flange 111. Above the current collector plate 132 is a ceramic insulation plate 131 which includes the anode off-gas exit passage 134. A compression plate 130 is set atop insulation plate 131. The fuel cell 118 is preferably surrounded by a conductive stainless steel flexible barrier wall 126, which is impervious to air or gases and which is yieldable to accommodate expansion and contraction of the fuel cell 118 during operation of the module. Electrical isolation is achieved between flexible barrier wall 126 and the fuel cell plates by the corner seals 127. The flexible barrier wall 126 will be provided with the oppositely-located orifice 128 (to receive incoming air from the air inlet 112) and conduit 129 (to allow exhaust of cathode off-gases from within the fuel cell).

It will also be understood that the reaction gas products from the partial oxidation reformer can also be employed in connection with a shift reactor to modify the gas products for discharge to the atmosphere or for other reactions. To this end, a shift reactor may be substituted for the fuel cell stack 118.

In alternate embodiments of this invention, a shift reactor/hydrogen purification electrochemical reaction device replaces the fuel cell 118. In such embodiments, the overall function of the system is to generate and purify hydrogen gas for use external to the system. In the embodiment illustrated in FIG. 1B, orifice 128 is connected to input 166 which provides steam to the cathode gas passages 180*a* (see FIG. 4A). The steam pressure in the cathode gas passages 180*a* is maintained greater than the process gas pressure in anode gas passages 182*a* to promote any cross-leakage to be steam and/or hydrogen from passages 180*a* back into anode gas passages 182*a*, and not the other direction. Orifice 128 is not connected to inlet air 112. The fuel cell hardware is operated as a hydrogen concentrator, which may require modifying the materials of construction of the cathode plates 180. Such modification would be apparent to one skilled in the art. Current from an external source or power supply is used to force electron flow through the electrochemical device. For example, the following reaction takes place with a solid oxide electrolyte cell:

$$\text{Anode} \quad H_2 + O^= \rightarrow H_2O + 2e^-$$

$$CO + H_2O \rightarrow H_2 + CO_2$$

$$\text{Cathode} \quad H_2O + 2e \rightarrow H_2 + O^=$$

$$\text{Overall} \quad H_2O + CO \rightarrow CO_2 + heat$$

$$H_2 \text{ mixed gas stream} \rightarrow H_2 \text{ in purified gas stream}$$

The net result is to promote the $CO/H_2O$ shift reaction to $CO_2$ and to move $H_2$ from the mixed gas stream in anode gas passages 182*a* to cathode gas passages 180*a*. In this embodiment, cathode outlet manifold 238 is connected to conduit 129, but conduit 129 is not connected to combustion prechamber 16. Conduit 129 is connected to the outside of housing 110 to provide purified and humidified hydrogen to some other use or appliance. In this embodiment, air is provided through conduit 138 to combustor 120 downstream of the electrochemical reaction device to facilitate combustion of any remaining hydrogen or carbon monoxide that exhausts the shift reactor/purification electrochemical device through passage 134.

In another embodiment of the hydrogen generation/purification system, a small amount of inlet air 112 can be combined with steam from input 166 prior to entering orifice 128. This mixture passes into cathode gas passages 180*a*, where the oxygen reacts on the cathode surfaces generating potentials that drive the hydrogen concentration process discussed above. The external electrical connections are used to extract or supplement energy needed by the electrochemical device.

In another embodiment of the hydrogen generation/purification system, the device 118 is constructed of metal and/or ceramic diffusion membranes that are porous to hydrogen but not to other gases in the mixed gas stream, such as nitrogen, carbon dioxide, and carbon monoxide, among others. These diffusion membranes consist of two sides (i.e., a mixed gas side and a purified product gas side), and can be supported or unsupported by porous ceramic structures. Because the diffusion membrane is porous to hydrogen gas, but not the other components of the mixed gas stream, only hydrogen gas is able to diffuse through the membrane from the mixed gas side to the purified product gas side. The membranes would replace electrolytic layers 184 and separator plate 302 of the fuel cell, and cathode plates 180 and anode plates 182 would be eliminated. A surface coating can be added to the membrane surface in anode gas passage 182a. In this embodiment, the partial pressure of the hydrogen gas in the mixed gas stream in the anode gas passage 182a drives the movement of hydrogen through the membrane and into the cathode gas passage 180a. Purified hydrogen flows through conduit 129 and out of the housing 110. Steam from input 166 flows through orifice 128 and into cathode gas passage 180a. The pressure of the steam in the cathode gas passage 180a is maintained greater than the pressure of the mixed gas stream in anode gas passage 182a. This steam has two critical functions. The first function is to ensure any cross-leakage that may occur is from cathode gas passage 180a into anode gas passage 182a, thereby maintaining product gas purity in passage 180a. The second function is to decrease the hydrogen partial pressure in cathode gas passage 180a with water vapor that is easily separated and removed downstream by use of a condenser. With counter-flow directions of the mixed gas stream in anode gas passage 182a and steam/purified hydrogen in cathode gas passage 180a, a positive hydrogen partial pressure driving force can be maintained even with extremely high recovery factors (for example, most if not all the hydrogen is moved from the mixed gas stream in anode gas passage 182a to the purified hydrogen stream in cathode gas passage 180a).

As described above, the present invention provides several embodiments that have a wide range of applications, as scaling of the configurations can be readily accomplished by those skilled in the art to provide the necessary heat, electrical energy, and/or purified hydrogen output for a particular application. Various modifications and equivalent substitutes may be incorporated into the invention as described above without varying from the spirit of the invention, as will also be apparent to those skilled in this technology. In addition, while particular terminology is used in the foregoing description to describe certain aspects and elements of the present invention, one skilled in the art would understand that other equivalent descriptive terms may be substituted therefor. For example, the term "air" is used herein, for convenience sake, to refer to any oxygen-containing gas suitable for use in the integrated power module. Furthermore, the Examples presented herein are intended for illustration purposes only and are not intended to act as a limitation on the scope of the following claims.

What is claimed is:

1. An integrated power module for converting combustible fuel into thermal and electrical energy, the power module comprising:

an outer housing;

a fuel inlet extending through the housing and through which is supplied the combustible inlet fuel for processing in the power module;

a gas inlet extending through the housing and through which is supplied an oxygen-containing inlet gas for processing in the power module;

means for heating a first portion of the inlet gas prior to combustion;

a partial-oxidation reformer within the housing for combusting the inlet fuel and the heated first gas portion at a stoichiometric gas/fuel ratio, of less than about 0.8, the reformer having a port for receiving the inlet fuel and the heated first gas portion and a port through which is ejected a hydrogen-containing product gas into an exhaust passage, wherein the receiving port and the ejecting port, are the same or different;

a nozzle having an end proximate to the reformer port for injecting the inlet fuel and the heated first gas portion to the reformer, the nozzle comprising a fuel injector and a gas injector and oriented to provide impingement of the injected fuel and the injected gas on a wall of the reformer and intermixing thereby wherein the fuel injector and the gas injector are the same or different;

a fuel cell within the housing for receiving and electrochemically processing at least a portion of the hydrogen-containing product gas from the reformer exhaust passage and a second portion of the inlet gas to yield thermal and electrical energy, the fuel cell comprising at least one anode, at least one cathode, an anode outlet passage into which is ejected anode exhaust gas, and a cathode outlet passage into which is ejected cathode exhaust gas, wherein the anode and the cathode are separated by electrolyte layers;

a cathode terminal and an anode terminal, the cathode and anode terminals being useful for supplying electrical current generated by the fuel cell to an external load; and a combustor within the housing for receiving and combusting at least a portion of the fuel cell exhaust gases with a third portion of the inlet gas at a stoichiometric gas/fuel ratio of at least about 1.1 to generate thermal energy.

2. The integrated power module of claim 1, further comprising means for heating the inlet fuel prior to combustion.

3. The integrated power module of claim 1, further comprising means for igniting the fuel/gas mixture in the reformer to initiate combustion.

4. The integrated power module of claim 1, further comprising one or more valves, wherein the one or more valves extend through the housing and provide temperature, composition, and/or humidity control over at least one parameter selected from the group consisting of the inlet gas, the inlet fuel, the injected fuel, the injected gas, the reformer product gas, the fuel cell inlet gas, the anode exhaust gas, the cathode exhaust gas, the combustor inlet gas, and the combustor exhaust gas.

5. The integrated power module of claim 4, wherein the parameter control is achieved by directing through the one or more valves at least one process enhancer selected from the group consisting of oxygen-containing gas, combustible fuel, water, steam, carbon dioxide, and air.

6. The integrated power module of claim 1, wherein the housing includes a removable cover.

7. The integrated power module of claim 1, wherein the fuel inlet is connected to a source of gaseous fuel.

8. The integrated power module of claim 1, wherein the gas inlet is connected to a source of oxygen-containing gas.

9. The integrated power module of claim 1, wherein the heating means comprises one or more heat exchange walls within the power module.

10. The integrated power module of claim 9, wherein at least one of the heat exchange walls is in thermal contact with the reformer product gas.

11. The integrated power module of claim 1, further comprising an exhaust duct extending through the housing for directing exhaust gas from the power module to outside the housing.

12. The integrated power module of claim 1, further comprising a heat transfer coil for recovering a portion of the thermal energy generated by the power module.

13. The integrated power module of claim 1, further comprising at least one compression spring within the housing for exerting a compressive force on the cathode and the anode in the fuel cell.

14. The integrated power module of claim 1, wherein the nozzle is coaxial, the coaxial nozzle comprising two or more concentric tubes defining an inner volume and an outer annular volume, wherein at least one of the defined volumes functions as the fuel injector and at least one of the other volumes functions as the gas injector.

15. The integrated power module of claim 1, wherein the nozzle comprises two or more concentric tubes arranged with a first tube disposed within a second tube, and a rod disposed in the first tube, thereby defining between the first tube and the second tube an outer annular volume and defining between the first tube and the rod an inner annular volume, wherein at least one of the annular volumes functions as the fuel injector and at least one of the other annular volumes functions as the gas injector.

16. The integrated power module of claim 15, wherein the rod comprises a tube disposed concentrically around and surrounding a spark igniter which is useful for igniting the injected fuel/gas mixture in the reformer.

17. The integrated power module of claim 1, wherein the electrolyte layers comprise a ceramic membrane which is ionically conducting.

18. The integrated power module of claim 17, wherein the ceramic membrane is also electrically conducting.

19. The integrated power module of claim 1, wherein the electrolyte layers comprise a molten carbonate.

20. A method for converting fuel into electrical and thermal energy using an integrated power module, the method comprising the steps of:
(a) directing an oxygen-containing inlet gas into the power module;
(b) directing inlet fuel into the power module;
(c) heating a first portion of the oxygen-containing gas;
(d) injecting the inlet fuel and the heated first gas portion into a reformer through a nozzle and against a wall of the reformer to effect intermixing of the injected fuel and the injected gas;
(e) combusting the injected fuel/gas mixture under partial-oxidation conditions within the reformer at a stoichiometric gas/fuel ratio of less than about 0.8 to generate a hydrogen-containing product gas and thermal energy;
(f) electrochemically processing the hydrogen-containing product gas generated by the reformer and a second portion of the inlet gas in a fuel cell having a cathode and an anode to yield thermal and electrical energy and to eject cathode exhaust gas and anode exhaust gas; and
(g) combusting the anode and cathode exhaust gases with a third portion of the inlet gas in a combustor at a stoichiometric gas/fuel ratio of at least about 1.1 to generate thermal energy.

21. The method of claim 20, further comprising the step of heating the inlet fuel prior to injection into the reformer.

22. The method of claim 20, wherein the combustion in the reformer is performed at a stoichiometric gas/fuel ratio of between about 0.1 and about 0.7.

23. The method of claim 20, wherein the combustion in the reformer is performed at a stoichiometric gas/fuel ratio of between about 0.2 and about 0.4.

24. The method of claim 20, wherein the combustion in the combustor is performed at a stoichiometric gas/fuel ratio greater than about 1.4.

25. An integrated power module, for converting combustible fuel into thermal and electrical energy, and purified hydrogen gas, the power module comprising:
an outer housing;
a fuel inlet extending through the housing and through which is supplied the combustible fuel for processing in the power module;
a gas inlet extending through the housing and through which is supplied an oxygen-containing gas for processing in the power module;
means for heating a first portion of the inlet gas prior to combustion;
a partial-oxidation reformer within the housing for combusting the inlet fuel and the heated first gas portion at a stoichiometric gas/fuel ratio of less than about 0.8 to generate a hydrogen-containing product gas, the reformer having a port for receiving the inlet fuel and the heated first gas portion and a port through which is ejected the product gas into an exhaust passage, wherein the receiving port and the ejecting port are the same or different;
a nozzle having an end proximate to the reformer port for injecting the inlet fuel and the heated first gas portion to the reformer, the nozzle comprising a fuel injector and a gas injector and oriented to provide impingement of the injected fuel and the injected gas on a wall of the reformer and intermixing thereby, wherein the fuel injector and the gas injector are the same or different; and
an electrochemical reaction device within the housing for receiving and electrochemically processing the hydrogen-containing product gas from the reformer exhaust passage to separate the hydrogen gas and thereby provide a purified hydrogen gas stream.

26. The integrated power module of claim 25, further comprising means for heating the inlet fuel prior to combustion.

27. The integrated power module of claim 25, further comprising a combustion chamber downstream of the electrochemical reaction device for combusting hydrogen and carbon monoxide that may exhaust the electrochemical reaction device.

28. A method of enriching hydrogen concentration in a gas mixture comprising carbon monoxide, steam, and hydrogen comprising the steps of:
(a) introducing the gas mixture into an electrochemical reactor having an anode and a cathode;
(b) directing the gas mixture across the anode;
(c) directing water across the cathode;
(d) passing electrical current through the electrochemical reactor;
(e) generating at the anode carbon dioxide and hydrogen product gases from a carbon monoxide/water (CO/$H_2O$) shift reaction;
(f) generating at the cathode hydrogen product gas; and
(g) directing the anode and cathode product gases out of the electrochemical reactor.

29. The method of claim 28, wherein the water directed across the cathode is in the form of steam.

30. A method of purifying an input gas mixture using a diffusion membrane porous to hydrogen gas having an input gas mixture side and a product gas side, the method comprising the steps of directing the input gas mixture in a first direction along the input side of the diffusion membrane and directing steam in a second direction along the product side of the diffusion membrane, wherein the first direction is substantially opposite the second direction.

31. The method of claim 30, wherein the steam pressure is greater than the gas mixture pressure.

32. The method of claim 30, wherein the steam and the product gas are directed to a condenser where the steam is separated from the product gas.

33. A nozzle for injecting fuel and gas, the nozzle comprising two or more concentric tubes arranged with a first tube disposed within a second tube, and a rod disposed in the first tube, thereby defining between the first tube and the second tube an outer annular volume and defining between the first tube and the rod an inner annular volume, wherein at least one of the annular volumes functions as the fuel injector and at least one of the other annular volumes functions as the gas injector, and wherein the rod comprises a tube disposed concentrically around and surrounding a spark igniter which is useful for igniting the injected fuel and gas.

* * * * *